(12) United States Patent
Ichihara et al.

(10) Patent No.: US 11,351,507 B2
(45) Date of Patent: Jun. 7, 2022

(54) METHOD OF EVALUATING LEVEL OF CLEANLINESS OF HOLLOW FIBER MEMBRANE DEVICE, METHOD OF WASHING HOLLOW FIBER MEMBRANE DEVICE, AND WASHING DEVICE FOR HOLLOW FIBER MEMBRANE DEVICE

(71) Applicant: ORGANO CORPORATION, Tokyo (JP)

(72) Inventors: Fumitaka Ichihara, Tokyo (JP); Hiroshi Sugawara, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 152 days.

(21) Appl. No.: 16/491,989

(22) PCT Filed: Feb. 8, 2018

(86) PCT No.: PCT/JP2018/004393
§ 371 (c)(1),
(2) Date: Sep. 6, 2019

(87) PCT Pub. No.: WO2018/163705
PCT Pub. Date: Sep. 13, 2018

(65) Prior Publication Data
US 2020/0070098 A1 Mar. 5, 2020

(30) Foreign Application Priority Data

Mar. 9, 2017 (JP) .............................. JP2017-044836

(51) Int. Cl.
*B01D 65/10* (2006.01)
*B01D 61/14* (2006.01)
(Continued)

(52) U.S. Cl.
CPC ........... *B01D 65/10* (2013.01); *B01D 61/145* (2013.01); *B01D 61/20* (2013.01); *B01D 65/02* (2013.01);
(Continued)

(58) Field of Classification Search
CPC ...... B01D 65/10; B01D 61/145; B01D 61/20; B01D 65/02; B01D 69/08; B01D 63/02;
(Continued)

(56) References Cited

U.S. PATENT DOCUMENTS

2005/0228610 A1    10/2005  Kousaka et al.
2016/0047730 A1*    2/2016  Tanaka .................. G01N 15/06
                                                        73/61.71
2016/0220958 A1*    8/2016  Fukui .................. B01D 61/025

FOREIGN PATENT DOCUMENTS

CN    102405093 A    4/2012
JP    04-136550      12/1992
(Continued)

OTHER PUBLICATIONS

Tanji Teru—JP-2016083646-A Machine Translation—2016 (Year: 2016).*
(Continued)

*Primary Examiner* — Bradley R Spies
*Assistant Examiner* — Jeannie McDermott
(74) *Attorney, Agent, or Firm* — Greenblum & Bernstein, P.L.C.

(57) ABSTRACT

The level of cleanliness of a hollow fiber membrane device is evaluated before it is installed in an ultrapure water production system. A method of evaluating the level of cleanliness of the hollow fiber membrane device includes capturing fine particles in permeating water by means of a first filter membrane, wherein the permeating water is ultrapure water that permeates through the hollow fiber mem-
(Continued)

brane device before the hollow fiber membrane device is installed in an ultrapure water production system; and analyzing the fine particles that are captured by the filter membrane.

12 Claims, 4 Drawing Sheets

(51) Int. Cl.
*B01D 61/20* (2006.01)
*B01D 65/02* (2006.01)
*B01D 69/08* (2006.01)
*C02F 1/44* (2006.01)
*G01N 15/08* (2006.01)
*C02F 103/04* (2006.01)

(52) U.S. Cl.
CPC .............. *B01D 69/08* (2013.01); *C02F 1/444* (2013.01); *G01N 15/0806* (2013.01); *C02F 2103/04* (2013.01); *G01N 2015/086* (2013.01)

(58) Field of Classification Search
CPC ........ C02F 1/444; C02F 2103/04; C02F 9/00; C02F 1/32; C02F 1/725; C02F 1/42; C02F 2001/427; C02F 1/20; C02F 1/70; C02F 2303/16; C02F 2209/105; G01N 15/0806; G01N 2015/086; G01N 2015/084; G01N 23/02; G01N 23/2251; G01N 23/2252
See application file for complete search history.

(56) References Cited

FOREIGN PATENT DOCUMENTS

| | | | |
|---|---|---|---|
| JP | 09-276672 | | 10/1997 |
| JP | 2000-288362 | | 10/2000 |
| JP | 2003-315245 | | 11/2003 |
| JP | 2003-315245 A | | 11/2003 |
| JP | 2004066015 A | * | 3/2004 |
| JP | 2006-297180 | | 11/2006 |
| JP | 2010127693 A | * | 6/2010 |
| JP | 2012-115810 | | 6/2012 |
| JP | 2012-154648 A | | 8/2012 |
| JP | 2013-031835 | | 2/2013 |
| JP | 2014-194359 | | 10/2014 |
| JP | 2016-055240 | | 4/2016 |
| JP | 2016-083646 | | 5/2016 |
| KR | 10-2015-0136606 A | | 12/2015 |

OTHER PUBLICATIONS

Mizuniwa, Tetsuo—JP-2012115810-A Machine Translation—2012 (Year: 2012).*

Official Communication dated Mar. 13, 2018 in International Application No. PCT/JP2018/004393.

Office Action issued in corresponding Taiwanese Application No. 107106921 dated Jun. 17, 2021.

Office Action issued in Taiwanese Patent Application No. 107106921 dated Feb. 19, 2021, along with English Translation thereof.

* cited by examiner

METHOD OF EVALUATING LEVEL OF CLEANLINESS OF HOLLOW FIBER MEMBRANE DEVICE, METHOD OF WASHING HOLLOW FIBER MEMBRANE DEVICE, AND WASHING DEVICE FOR HOLLOW FIBER MEMBRANE DEVICE

TECHNICAL FIELD

The present application is based upon and claims priority from Japanese Patent Application No. 2017-44836 filed on Mar. 9, 2017, the disclosure of which is hereby incorporated by reference herein in its entirety.

The present invention relates to a method of evaluating the level of cleanliness of a hollow fiber membrane device, a method of washing a hollow fiber membrane device, and a washing device for a hollow fiber membrane device, particularly to a method of evaluating the level of cleanliness of an ultrafiltration membrane device that is washed before it is installed in an ultrapure water production system.

BACKGROUND ART

A hollow fiber membrane device, such as an ultrafiltration membrane device, is installed at the end of an ultrapure water production system in order to remove fine particles. Hollow fiber membranes can be installed with higher density than flat membranes and pleated membranes, and can increase the volume of permeating water per module. In addition, hollow fiber membrane devices can be easily manufactured while keeping the devices in a highly clean condition. Shipment, installation in an ultrapure water production system and on-site replacement can also be performed while keeping the devices in a highly clean condition. In other words, it is easy to manage the level of cleanliness of a hollow fiber membrane device.

Since the requirement of the water quality of ultrapure water has become strict, the requirement of ultrafiltration membrane devices also has become strict. In addition, ultrapure water production systems are required to start in a short time. Thus, a method has been proposed, in which a hollow fiber membrane device is washed in advance. In this case, it is preferable to confirm whether or not the hollow fiber membrane device has a predetermined level of cleanliness after it has been washed. JP2014-194359 discloses a method of capturing fine particles that are contained in sample water by means of a filter membrane device and observing the fine particles by means of a scanning electron microscope (SEM). JP2013-031835 discloses a method for evaluating particle removing performance of a device, such as a microfiltration membrane device and an ultrafiltration membrane device. The method includes feeding sample liquid through the device and detecting fine metal particles that are contained in permeating liquid. Fine metal particles are added to the sample liquid in advance.

SUMMARY OF INVENTION

The method described in JP2014-194359A is directed to capturing and analyzing fine particles that are contained in the sample water, but the level of cleanliness of the hollow fiber membrane device itself cannot be evaluated. The method described in JP2013-031835A involves intentionally causing a filter membrane device to capture fine metal particles, but as a result, the filter membrane device itself is contaminated with the fine metal particles. Thus, this method cannot be applied to evaluation of the level of cleanliness of a filter membrane device before it is installed in an ultrapure water production system.

The present invention aims at providing a method of evaluating the level of cleanliness of a hollow fiber membrane device before it is installed in an ultrapure water production system.

A method of evaluating the level of cleanliness of a hollow fiber membrane device of the present invention comprises: capturing fine particles in permeating water by means of a first filter membrane, wherein the permeating water is ultrapure water that permeates through the hollow fiber membrane device before the hollow fiber membrane device is installed in an ultrapure water production system; and analyzing the fine particles that are captured by the first filter membrane.

According to the present invention, ultrapure water is permeated through the hollow fiber membrane device, and fine particles that are contained in the permeating water are captured by the first filter membrane. Determination can be made whether or not the hollow fiber membrane device has a predetermined level of cleanliness by analyzing the number and properties of the fine particles that are contained in the permeating water. Therefore, accordingly to the present invention, it is possible to evaluate the level of cleanliness of the hollow fiber membrane device before it is installed in an ultrapure water production system.

The above-described and other objects, features, and advantages of this application will become apparent from the following detailed description with reference to the accompanying drawings that illustrate the present application.

LIST OF REFERENCE NUMERALS

Figure 1:
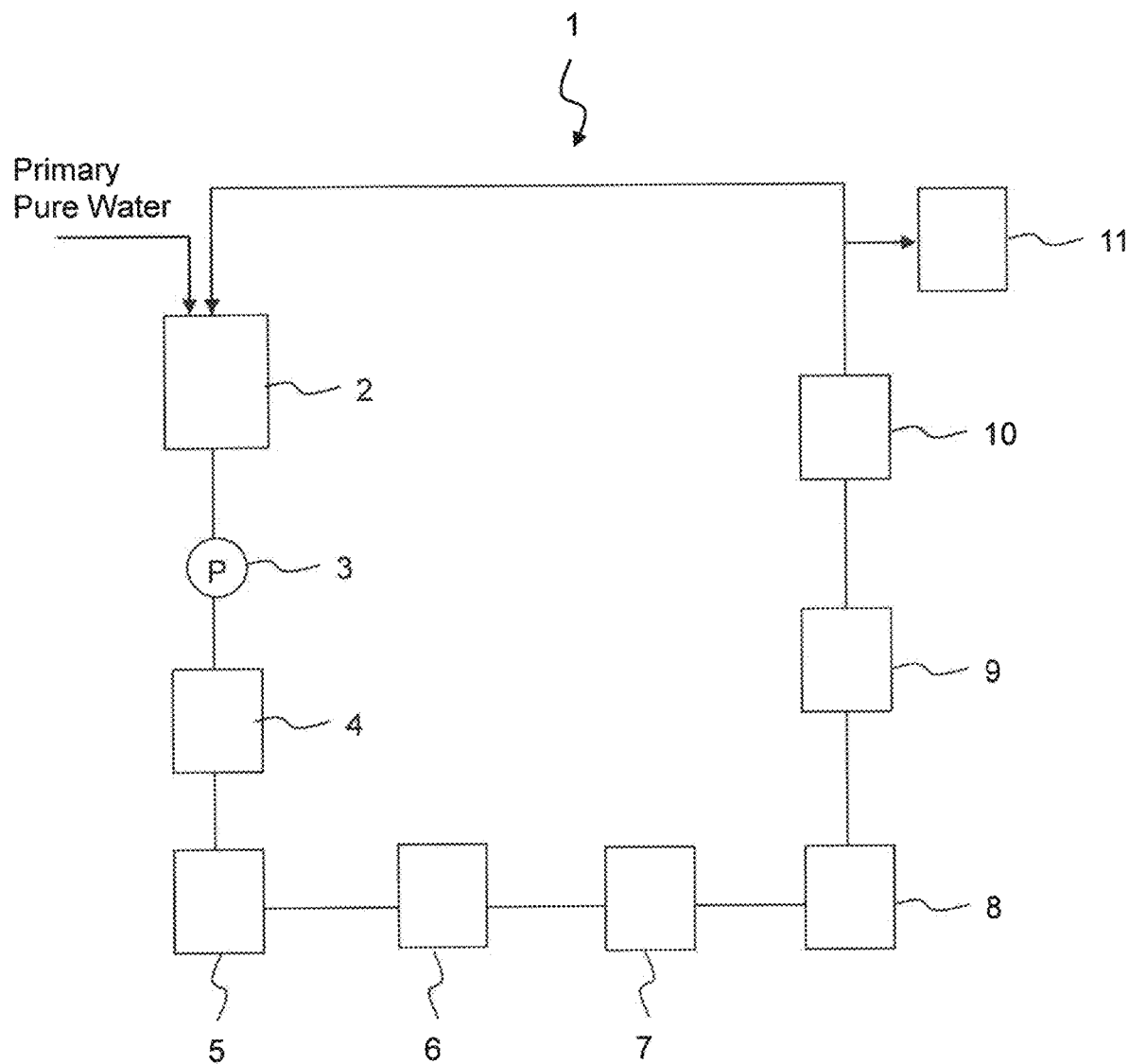
FIG. 1 is a schematic diagram of the configuration of an ultrapure water production system.

1: ultrapure water production system
10: ultrafiltration membrane device
12: housing
13: hollow fiber membrane
21: washing device
22: washing water supply line
23: first outlet line
24: second outlet line
25: liquid supply pipe
31: centrifugal filter
32: filter body
35: first filter membrane
35': second filter membrane

DESCRIPTION OF EMBODIMENTS

Embodiments of the present invention will be described hereinbelow with reference to the drawings. FIG. 1 illustrates an exemplary configuration of ultrapure water production system 1, to which the present invention is applied. Ultrapure water production system 1 includes primary pure water tank 2, pump 3, heat exchanger 4, ultraviolet oxidation device 5, hydrogenation device 6, catalytic reaction device 7, non-regenerative mixed bed ion exchange device (cartridge polisher) 8, membrane degassing device 9 and ultrafiltration membrane device 10. These components constitute a secondary pure water system (subsystem), which performs a series of processes on primary pure water that is produced by a primary pure water system (not shown) in order to produce ultrapure water, and supplies the ultrapure water to point of use 11.

Water to be treated (primary pure water) that is stored in primary pure water tank 2 is fed by pump 3 and is supplied to heat exchanger 4. The water to be treated that passes through heat exchanger 4, where the temperature is adjusted, is supplied to ultraviolet oxidation device 5. The water to be treated is irradiated with ultraviolet rays at ultraviolet oxidation device 5 in order to decompose total organic carbon (TOC) in the water to be treated. Hydrogen is added to the water to be treated at hydrogenation device 6, and oxidizing substances in the water to be treated are removed at oxidizing substance removal device 7. Further, metallic ions and the like in the water to be treated are removed in an ion exchange process at cartridge polisher 8, and remaining oxidizing substances (oxygen) are removed at membrane degassing device 9. Fine particles in the water to be treated are then removed at ultrafiltration membrane device 10. Part of the ultrapure water thus obtained is supplied to point of use 11 and the remainder thereof flows back to primary pure water tank 2. Primary pure water is supplied to primary pure water tank 2 from a primary pure water system (not shown), as needed.

Figure 2:
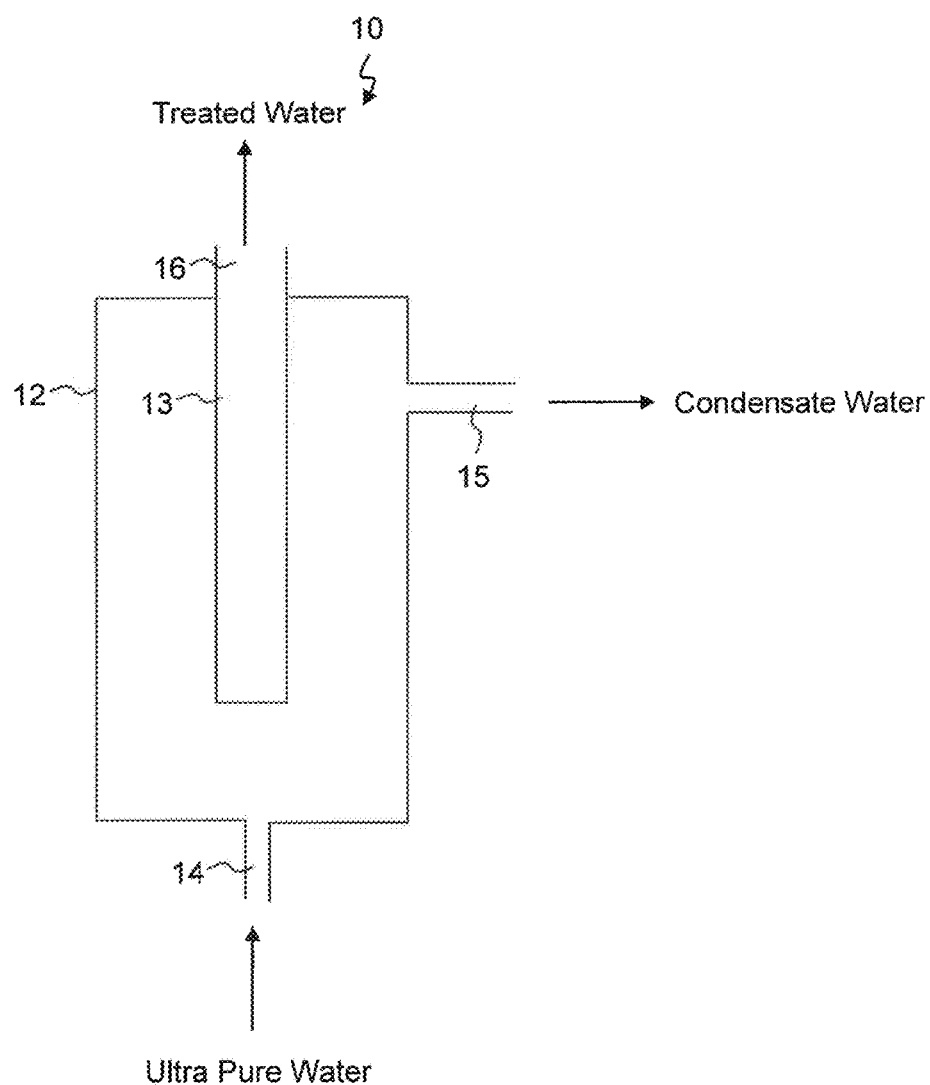
FIG. 2 is a schematic diagram of the configuration of an ultrafiltration membrane device.

FIG. 2 illustrates an exemplary conceptual diagram of ultrafiltration membrane device 10. Ultrafiltration membrane device 10 has housing 12 and a plurality of hollow fiber membranes 13 that are accommodated in housing 12. In the figure, only one hollow fiber membrane 13 is shown. Housing 12 and hollow fiber membranes 13 are provided in the form of a module, and ultrafiltration membrane device 10 is also called an ultrafiltration membrane module. Housing 12 includes inlet 14 for water to be treated and outlet 15 for concentrated water, both of which are in communication with the internal space of housing 12 (except for the internal space of hollow fiber membrane 13), and outlet 16 for treated water that is in communication with the internal space of hollow fiber membrane 13. The concentrated water is ultrapure water in which the density of fine particles (fine particles per milliliter) is increased by the fine particles that do not permeate through hollow fiber membrane 13. The water to be treated (ultrapure water) that flows into housing 12 via inlet 14 for water to be treated permeates through hollow fiber membrane 13 from the outside to the inside. Fine particles that are contained in the water to be treated remain outside of hollow fiber membrane 13 because they cannot pass through hollow fiber membrane 13, and the fine particles are discharged from outlet 15 of housing 12 for concentrated water. The treated water that is free of fine particles is discharged through outlet 16 for treated water. The system in which water to be treated permeates through hollow fiber membrane 13 from the outside to the inside is called an external pressure system. An internal pressure system, in which water to be treated permeates through hollow fiber membrane 13 from the inside to the outside may also be used. However, because it is easy to keep the internal space of hollow fiber membrane 13 clean in the manufacturing processes, the external pressure system is preferable as ultrafiltration membrane device 10 that is installed at the end of ultrapure water production system 1 from the standpoint of obtaining treated better quality water. It should be noted that the configuration of ultrafiltration membrane device 10 illustrated in FIG. 2 is merely an example and that configurations different from that illustrated in FIG. 2 are also applicable. Examples of ultrafiltration membrane devices 10 include an ultrafiltration membrane module having a hollow fiber membrane that is made of polysulfone and that has a cutoff molecular weight of 6000 (e.g., NTU-3306-K6R manufactured by Nitta Denko Corporation and OLT-6036H manufactured by Asahi Kasei Corporation).

Figure 3:
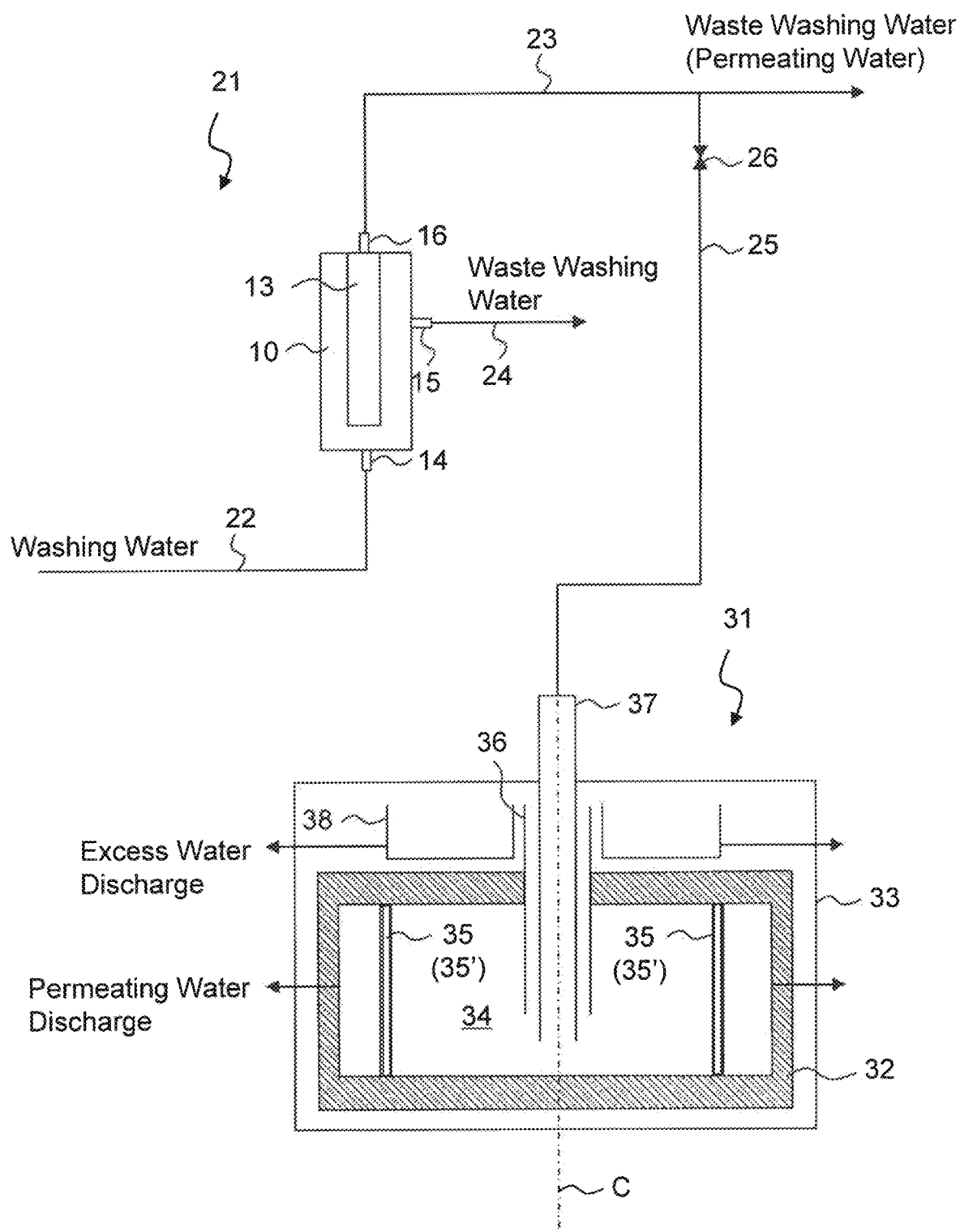
FIG. 3 is a schematic diagram of the configuration of a washing device for an ultrafiltration membrane device.

FIG. 3 illustrates a schematic configuration of washing device 21 for ultrafiltration membrane device 10. Washing device 21 has washing water supply line 22 that is connected to inlet 14 of ultrafiltration membrane device 10 for water to be treated, first outlet line 23 for washing water that is connected to outlet 16 of ultrafiltration membrane device 10 for treated water, and second outlet line 24 for the washing water that is connected to outlet 15 of ultrafiltration membrane device 10 for concentrated water. The waste water that is discharged from first outlet line 23 and second outlet line 24 is disposed of without being reused.

Washing device 21 includes centrifugal filter 31 that is connected to liquid supply pipe 25 that branches from first outlet line 23. Centrifugal filter 31 has filter body 32 and chamber 33 that accommodates filter body 32. Filter body 32 can be rotated about rotation center axis C by means of a motor (not shown). First filter membranes 35 are detachably held in internal space 34 of filter body 32. With the rotation of filter body 32, the liquid in internal space 34 is pressed radially outward, i.e., toward first filter membranes 35. First filter membranes 35 are preferably used after confirming, in a blank state (before sampling), that (blank) fine particles that are present on the membranes do not affect the results of evaluation and analysis.

The pore diameter of first filter membrane 35 is determined depending on the particle diameters of fine particles to be captured. When fine particles that are contained in ultrapure water are captured, a pore diameter in the order of 30 nanometers (nm) is preferably selected for the reason described later. As first filter membrane 35, an anodic oxide membrane, an ultrafiltration membrane, a track-etched membrane, etc. may be used, and especially, an anodic oxide film is preferably used. Anodic oxide membrane is an oxide film that is formed on a metal surface at a time of applying current to an electrolyte solution using a metal as an anode, and an example is an aluminum oxide film that is formed on the surface of aluminum. When first filter membrane 35 having a pore diameter in the order of 30 nm is used, an anodic oxide membrane is preferably used because of good permeability, a smooth membrane surface (which facilitates SEM observation), etc. When an anodic oxide membrane is used, the fine particles (blank particles) that are generated by first filter membrane 35 itself are aluminum oxide fine particles, which are inorganic. Meanwhile, components that are in contact with liquid in an ultrapure water production system (joints, pipes, ion exchange resins, ultrafiltration membrane device 10, etc.) are usually formed of organic materials, and many components made of Teflon (registered trademark) such as PFA (organic materials) are used in washing device 21. Accordingly, by using an anodic oxide membrane, which is an inorganic membrane, as first filter membrane 35, it becomes easy to determine whether the components of fine particles are organic or not in composition analysis. As a result, it is possible to accurately measure and analyze impurities, especially, organic fine particles, in highly purified ultrapure water that is used in the manufacturing processes of electronic components.

An opening is formed at the central portion of filter body 32, and excess water discharge pipe 36 extends through the opening. Excess water discharge pipe 36 extends in the vertical direction coaxially with rotation center axis C. Liquid supply pipe 37 that is connected to liquid supply pipe 25 extends in the vertical direction in excess water discharge pipe 36. Liquid reservoir 38 is provided outside filter body 32 and outward of excess water discharge pipe 36.

Next, the method of washing ultrafiltration membrane device 10 by means of washing device 21, as well as the method of evaluating the result of washing (the level of cleanliness), will be described. First, ultrafiltration membrane device 10 is installed in washing device 21. Specifically, inlet 14 of ultrafiltration membrane device 10 for water to be treated is connected to washing water supply line 22; outlet 16 of ultrafiltration membrane device 10 for treated water is connected to first outlet line 23; and outlet 15 of ultrafiltration membrane device 10 for concentrated water is connected to second outlet line 24. Next, washing water is supplied from supply line 22 to ultrafiltration membrane device 10 in order to wash ultrafiltration membrane device 10. Ultrapure water is used as the washing water. After feeding ultrapure water for a predetermined time, valve 26 of liquid supply pipe 25 is opened and the water that permeates through ultrafiltration membrane device 10 is sampled and delivered to centrifugal filter 31 while ultrapure water continues to be fed. The motor of centrifugal filter 31 is activated in advance in order to rotate filter body 32. Since the washing step (rinsing step) and the sampling step are performed at the same time, it is not necessary to separately carry out the step of feeding ultrapure water for the sampling. The washing water may be functional water, an acid chemical solution or an alkali chemical solution, each diluted with ultrapure water. When a chemical solution or the like is used, ultrafiltration membrane device 10 is preferably rinsed with ultrapure water. Valve 26 of liquid supply pipe 25 is rinsed.

The permeating water that permeates through ultrafiltration membrane device 10 flows into internal space 34 of filter body 32 through liquid supply pipe 25 and liquid supply pipe 37. The permeating water is pressed against first filter membranes 35 on both sides due to centrifugal force and is filtered by first filter membranes 35. The permeating water is filtered, reaches spaces radially outward of first filter membranes 35, and is then discharged to the outside of chamber 33 as filtered water. An integrating flowmeter (not shown) is provided on a discharge pipe (not shown) for the filtered water in order to measure the accumulated amount of the filtered water that is discharged. Fine particles are captured by first filter membranes 35.

When the pore diameter of first filter membrane 35 is in the order of 30 nm, most of the permeating water becomes excess water because of large pressure loss of the filter membrane itself. The excess water rises along the inner wall surface of excess water discharge pipe 36 that is rotating, is collected by liquid reservoir 38, and is discharged to the outside of chamber 33 via a discharge channel (not shown).

After centrifugal filter 31 is operated for a predetermined time, the operation of centrifugal filter 31 is stopped and first filter membranes 35 are removed. The number, particle diameter, composition, etc. of the fine particles captured on the surfaces of first filter membranes 35 that were removed are observed by means of a fine particles detection device, such as an optical microscope, an scanning electron microscope (SEM), a transmission electron microscope (TEM) or an atomic force microscope (AFM), or by a method, such as an energy dispersive X-ray analysis (EDX), an electron energy loss spectroscopy (EELS) or an X-ray photoelectron spectroscopy (XPS). The number of fine particles that are contained in the permeating water per unit volume, the particle diameter distribution of the fine particles and the composition of the fine particles can be determined based on the amount of filtered water that is measured by the integrating flowmeter. If they conform to predefined reference values, ultrafiltration membrane device 10 is considered to have been sufficiently washed, to have a predetermined level of cleanliness and can now be installed in ultrapure water production system 1.

The inventors examined the fine particles that are contained in the permeating water in ultrafiltration membrane device 10 by means of an SEM. Specifically, a new ultrafiltration membrane device (hereinafter referred to as "ultrafiltration membrane device for evaluation") was installed in the washing device of FIG. 3; ultrapure water was fed through the ultrafiltration membrane device for evaluation; the permeating water in the ultrafiltration membrane device for evaluation was supplied to centrifugal filter 31; the fine particles were captured by means of second filter membrane 35' having a particle size of 10 nm; and particle diameter distribution of the fine particles was determined based on the image obtained by the SEM observation. Since the particle size of second filter membrane 35' is 10 nm, fine particles having diameters equal to or larger than 10 nm were detected. As a result, it was confirmed that the permeating water contained fine particles having particle diameters that could be captured by the ultrafiltration membrane device for evaluation (i.e., that should have not been contained in the permeating water).

Figure 4:
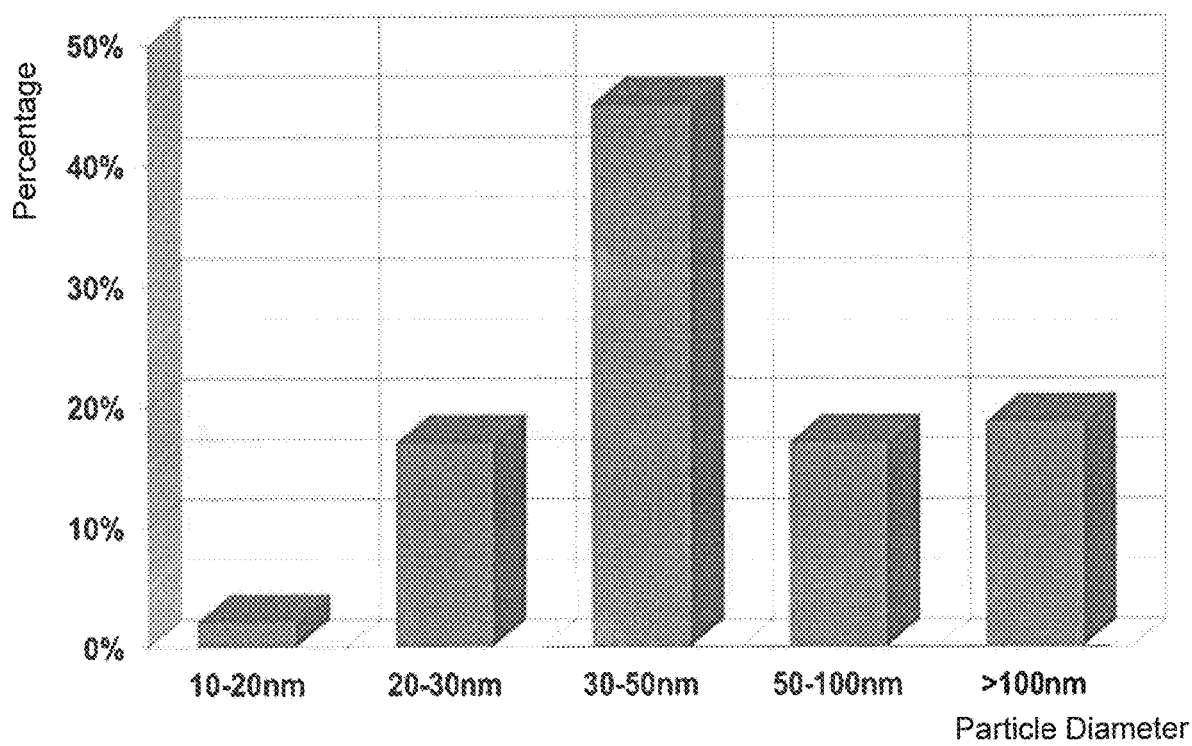
FIG. 4 is a diagram showing particle diameter distribution of fine particles that are contained in permeating water in an ultrafiltration membrane device.

FIG. 4 shows a particle diameter distribution of the fine particles thus obtained. The particle diameter distribution thus obtained has a mode (peak) in the particle diameter of 30 to 50 nm, which is different from a particle diameter distribution in which the number of fine particles monotonically decreases as the particle diameter increases. In addition, fine particles having particle diameters of 100 nm or more were also contained at a considerable rate. Further, an EDX analysis showed that most of the fine particles having particle diameters of 30 nm or more were organic substances that contain C, S, and Si. In view of the above, it was estimated that these fine particles are derived from PS (polysulfone), which is the material of the ultrafiltration membrane device for evaluation, and that these fine particles had adhered to the ultrafiltration membrane device for evaluation on the secondary side thereof (on the side of the permeating water). In this manner, it was confirmed that a new ultrafiltration membrane device for evaluation affects the quality of ultrapure water (fine particles in ultrapure water).

Fine particles that are contained in new ultrafiltration membrane device 10 can be removed to a considerable degree by the washing described above. However, it is preferable to confirm, after washing, that ultrafiltration membrane device 10 that was washed has a predetermined level of cleanliness. In order to do so, it is necessary to feed ultrapure water through ultrafiltration membrane device 10 after washing, and thereafter, to measure the fine particles that are contained in the permeating water by a liquid particle counter (LPC), or to capture the fine particles by means of a centrifugal filter for direct observation (direct microscopy). Because the minimum particle diameter that can be observed by an LPC is in the order of 20 nm, it is desirable to adopt the direct microscopy when detecting fine particles having particle diameters smaller than that (e.g., particle diameter of 10 nm). However, capturing fine particles of small particle diameters requires a filter membrane having a small pore diameter, and it takes a long time to capture the fine particles. This is because a sufficiently large flow rate cannot be obtained because of very large pressure loss of a filter membrane having a small particle diameter. Even if a centrifugal filter is used, it takes about several weeks to one month to capture fine particles having a particle diameter of 10 nm until a sufficient number of fine particles can be captured for direct microscopy.

However, as shown in FIG. 4, the percentage of fine particles having particle diameters of 10 to 20 nm is very small, and the same experiments conducted on ultrafiltration membrane devices of a plurality of manufacturers showed the same results as shown in FIG. 4. It is concluded from this that, essentially, it is important to remove fine particles having the particle diameters equal to or larger than 30 nm in order to reduce the fine particles having particle diameters of 10 nm or more during washing. In other words, even if an ultrafiltration membrane device is installed in an ultrapure water production system that produces ultrapure water in which fine particles are managed at the level of 10 nm, it is not necessary to measure and evaluate fine particles of the level of 10 nm in a pre-shipment washing of the ultrafiltration membrane device, but instead, it is possible to estimate whether or not the washing was properly conducted by measuring and evaluating fine particles of 30 nm or larger. As described above, according to the present embodiment, it is sufficient to use a filter membrane having a pore diameter in the order of 30 nm in order to capture fine particles. As a result, the time that is needed to capture fine particles is in the order of several days to one week, and a significant time saving is achieved.

The mode of particle diameters is 30 to 50 nm in FIG. 4. However, it is possible, in general, to determine the mode of particle diameters for each ultrafiltration membrane device (ultrafiltration membrane module product) according to the above-described method and to capture fine particles by first filter membrane 35 having a pore diameter similar to the mode of the particle diameters. Accordingly, if the data as shown in FIG. 4 is obtained in advance by using second filter membrane 35' having a pore diameter in the order of 10 nm and the mode is determined therefrom, then quality inspection that combines first filter membrane 35 of the same type as second filter membrane 35' to the direct microscopy by an SEM is performed thereafter, and thereby an ultrafiltration membrane device, whose cleanliness has been confirmed, can be installed in the ultrapure water production system. Here, first filter membrane 35 of the same type means a filter membrane having the same model number as that of second filter membrane for evaluation 35'. However, even if a filter membrane has a model number that is different from that of second filter membrane 35', the filter membrane can be regarded as a filter membrane of the same type as long as the filter membrane has a pore diameter similar to that of second filter membrane 35' and as long as it is formed of the same material and it is manufactured by the same manufacturing method. The data as shown in FIG. 4 may also be obtained by a third party. While the particle diameter of fine particles to be captured varies depending on the quality requirement of ultrapure water, it is normally sufficient to use first filter membrane 35 having a pore diameter in the order of 30 to 50 nm, but depending on the requirements of water quality, it is also possible to use first filter membrane 35 having a pore diameter in the order of 50 to 100 nm or larger than 100 nm.

In addition, although the present embodiment is directed to an ultrafiltration membrane device that is installed at the most downstream stage of an ultrapure water production system, the present invention may be used for washing of and evaluating the level of cleanliness of any hollow fiber membrane device, such as ultrafiltration membrane devices of different types and a microfiltration membrane device. Furthermore, while the present embodiment is directed to a new ultrafiltration membrane device, the present invention may also be used for washing of or regeneration of a used hollow fiber membrane device.

Although some preferred embodiments of the present invention have been illustrated and described in detail, it should be appreciated that various changes and modifications can be made thereto without deviating from the spirit and the scope of the appended claims.

The invention claimed is:

1. A method of evaluating a level of cleanliness of a hollow fiber membrane device, the method comprising:
   capturing fine particles in permeating water by means of a first filter membrane, wherein the permeating water is ultrapure water that permeates through the hollow fiber membrane device before the hollow fiber membrane device is installed in an ultrapure water production system; and
   analyzing the fine particles that are captured by the first filter membrane,
   wherein a pore diameter of the first filter membrane is equal to or greater than a mode of particle diameters of fine particles that are captured by a second filter membrane, wherein the second filter membrane has a smaller pore diameter than the first filter membrane, and the fine particles that are captured by the second filter membrane are fine particles that are contained in permeating water, wherein the permeating water is ultrapure water that is fed to a hollow fiber membrane device for evaluation, which is of a same type as the hollow fiber membrane device, and that permeates through the hollow fiber membrane device for evaluation.

2. The method according to claim 1, wherein a pore diameter of the first filter membrane is equal to or larger than 30 nanometers.

3. The method according to claim 1, further comprising:
   feeding ultrapure water to the hollow fiber membrane device for evaluation and capturing fine particles in the permeating water using the second filter membrane;
   determining a particle diameter distribution of the fine particles that are captured by the second filter membrane; and
   determining a mode of particle diameters from the particle diameter distribution.

4. The method according to claim 1, wherein analyzing the fine particles that are captured by the first filter membrane includes observing the fine particles by a scanning electron microscope and measuring a number of the fine particles in the permeating water per unit volume using the scanning electron microscope.

5. The method according to claim 1, wherein analyzing the fine particles that are captured by the first filter membrane includes analyzing composition of the fine particles using energy dispersive X-ray analysis or electron energy loss spectroscopy.

6. The method according to claim 1, wherein the hollow fiber membrane device is an ultrafiltration membrane device that is installed at a most downstream stage of an ultrapure water production system.

7. A method of washing a hollow fiber membrane device, the method comprising:
- feeding ultrapure water through the hollow fiber membrane device before the hollow fiber membrane device is installed in an ultrapure water production system and thereby washing the hollow fiber membrane device; and
- evaluating the cleanness of the hollow fiber membrane device in accordance with the method according to claim 1.

8. A washing device for a hollow fiber membrane device, the washing device comprising:
- a washing mechanism that feeds water through a hollow fiber membrane device before the hollow fiber membrane device is installed in an ultrapure water production system and that thereby washes the hollow fiber membrane device; and
- a particle capturing mechanism that collects permeating water in the hollow fiber membrane device, wherein a first filter membrane that captures fine particles that are contained in the permeating water can be installed in the particle capturing mechanism,
- wherein a pore diameter of the first filter membrane is equal to or greater than a mode of particle diameters of fine particles that are captured by a second filter membrane, wherein the second filter membrane has a smaller pore diameter than the first filter membrane, and the fine particles that are captured by the second filter membrane are fine particles that are contained in permeating water, wherein the permeating water is ultrapure water that is fed to a hollow fiber membrane device for evaluation, which is of a same type as the hollow fiber membrane device, and that permeates through the hollow fiber membrane device for evaluation.

9. The washing device for the hollow fiber membrane device according to claim 8, wherein the particle capturing mechanism includes a centrifugal filter.

10. A method of evaluating a level of cleanliness of a hollow fiber membrane device, the method comprising:
- capturing fine particles in permeating water by means of a first filter membrane, wherein the permeating water is ultrapure water that permeates through the hollow fiber membrane device before the hollow fiber membrane device is installed in an ultrapure water production system;
- analyzing the fine particles that are captured by the first filter membrane;
- feeding ultrapure water to the hollow fiber membrane device for evaluation and capturing fine particles in the permeating water using the second filter membrane;
- determining a particle diameter distribution of the fine particles that are captured by the second filter membrane; and
- determining a mode of particle diameters from the particle diameter distribution,
- wherein a pore diameter of the first filter membrane is equal to or greater than a mode of particle diameters of fine particles that are captured by a second filter membrane, wherein the second filter membrane has a smaller pore diameter than the first filter membrane, and the fine particles that are captured by the second filter membrane are fine particles that are contained in permeating water, wherein the permeating water is ultrapure water that is fed to a hollow fiber membrane device for evaluation, which is of a same type as the hollow fiber membrane device, and that permeates through the hollow fiber membrane device for evaluation.

11. The method according to claim 1, further comprising:
- determining from the analyzing whether or not the hollow fiber membrane is at or above a predetermined level of cleanliness for installation in the ultrapure water production system.

12. The washing device for the hollow fiber membrane device according to claim 8, further comprising:
- an analyzer that analyzes the fine particles that are captured by the first filter membrane; and determines whether or not the hollow fiber membrane is at or above a predetermined level of cleanliness for installation in the ultrapure water production system.

\* \* \* \* \*